United States Patent [19]

Ryuichi

[11] 4,265,493
[45] May 5, 1981

[54] BRAKE FLUID PRESSURE CONTROL VALVE RESPONSIVE TO DECELERATION

[75] Inventor: Tanaka Ryuichi, Yokosuka, Japan

[73] Assignee: Nippon Air Brake Co., Ltd., Kobe, Japan

[21] Appl. No.: 50,682

[22] Filed: Jun. 21, 1979

[30] Foreign Application Priority Data

Jun. 29, 1978 [JP] Japan ............................... 53-79164

[51] Int. Cl.³ ............................................. B60T 8/14
[52] U.S. Cl. ................................... 303/24 C; 303/6 C
[58] Field of Search ................. 303/6 C, 6 R, 24 A, 303/24 B, 24 C, 24 F

[56] References Cited

U.S. PATENT DOCUMENTS

| 3,825,303 | 7/1974 | Yabuta | 303/6C |
| 3,881,786 | 5/1975 | Hayes | 303/24 F |
| 3,922,020 | 11/1975 | Kolke et al. | 303/6 C |
| 4,141,596 | 2/1979 | Takeshita et al. | 303/24 C |

Primary Examiner—Duane A. Reger
Attorney, Agent, or Firm—McDougall, Hersh & Scott

[57] ABSTRACT

A brake fluid pressure control valve is inserted into a brake line connecting the master brake cylinder to the rear wheels of an automobile, and varies the braking pressure applied to the rear wheel brakes at a predetermined value of deceleration to prevent the rear wheels from locking up. Such a valve includes a main body having cylindrical bores of different diameters including a pressure-regulating piston and a hollow control piston slidably fitted within the cylindrical bores. A ball valve responsive to deceleration is disposed within the hollow of the control piston to selectively open and close a passage connecting the hollow to a pressure chamber. The ball closes the passage when the deceleration of an automobile has reached a predetermined value.

20 Claims, 3 Drawing Figures

BRAKE FLUID PRESSURE CONTROL VALVE RESPONSIVE TO DECELERATION

BACKGROUND OF THE INVENTION

1. Field of the Invention:

This invention relates to a brake fluid-pressure control valve responsive to deceleration, most suitable for an automobile, and more particularly to a brake fluid-pressure control valve responsive to deceleration in which the ratio of rear wheel brake pressure to front wheel brake pressure is so reduced at brake fluid pressures beyond a predetermined brake fluid pressure, namely a control start brake fluid pressure, as to prevent the rear wheels from locking.

2. Description of the Prior Art:

When an automobile is strongly or rapidly braked, it is decelerated at a high rate. At such a time, the center of gravity of the automobile moves realtive to the wheels by the inertia of the automobile, and the load applied to the rear wheels is reduced. Thus, the reaction force between the rear wheels and the road is reduced, so that the rear wheels are apt to lock.

In order to prevent the rear wheels from locking, a brake fluid pressure control valve is arranged in a rear wheel brake system. The brake fluid pressure control valve causes the brake fluid pressure applied to the rear wheels to increase at a lower rate than the other fluid pressure applied to the front wheels when a predetermined brake fluid pressure is reached.

However, when, the control start brake fluid pressure (i.e. the pressure at which the increase rate of the brake fluid pressure applied to the rear wheels starts to reduce), is held constant regardless of the charge condition or load factor of the automobile, it is difficult to always prevent an automobile charged with much variable load, such as a truck, from locking. The load applied to the rear wheels remarkably varys between the no-load condition and the full-load condition in the truck.

When the predetermined control start fluid pressure is the optimum for the automobile charged with no load, the brake fluid pressure applied to the rear wheels of the automobile charged with some load is lower than required, and sufficient brake force cannot be supplied to the rear wheels. When the predetermined control start fluid pressure is the optimum for the automobile charged with full load, the brake fluid pressure applied to the rear wheels of the automobile charged with no load is higher than required, and there is the fear that the rear wheels lock. Such a fluid pressure control valve is unsatisfactory.

In order to remove the above described defects, a fluid pressure control valve responsive to deceleration was proposed which utilizes the fact that a brake fluid pressure which imparts a predetermined deceleration to an automobile is proportional to the weight of the automobile. In the fluid pressure control valve, brake fluid pressure is detected at which the deceleration of the automobile reaches a predetermined valve, and a control start fluid pressure is determined in accordance with the detected brake fluid pressure.

The above-described fluid-pressure control valve responsive to deceleration comprises; a stepped pressure-regulating piston having a smaller area subjected to a brake fluid pressure from a master cylinder; and a larger area subjected to a brake fluid pressure to be applied to rear wheel brake cylinders, valve means for opening and closing a passage extending from the master cylinder to the rear wheel brake cylinders in response to the movement of the pressure-regulating piston; and spring means for urging the pressure-regulating piston in the direction to open the valve and determining a control start fluid pressure. The urging force of the spring means for urging the pressure-regulating piston is so designed as to be proportional to the brake fluid pressure at which the deceleration of the automobile has reached a predetermined value.

In the above arrangement, the urging force of the spring means is proportional to the brake fluid pressure at which the deceleration of the automobile has reached the predetermined valve. And the control start fluid pressure is proportional to the urging force of the spring means. Therefore, the ratio of the control start fluid pressure to the brake fluid pressure at which the deceleration of the automobile has reached the predetermined value is constant regardless of the weight or load of the automobile.

However, as well known, the ratio of the load applied to the rear wheels to the load applied to the front wheels is smaller in the no-charge condition of the automobile than in the charge condition of the automobile. Accordingly, there is in the no-charge condition the possibility that the rear wheels lock at a lower decelration than a predetermined deceleration. On the other hand, the ratio of the load applied to the rear wheels to the load applied to the front wheels is larger in the charge condition of the automobile than in the no-charge condition of the automobile. Accordingly, there is little possibility in the charge condition that the rear wheels will lock even at a higher deceleration than the predetermined deceleration. However, a sufficient brake force cannot be always obtained.

Accordingly, it is desirable to determine the control start fluid pressure in accordance with the load applied to the rear wheels or the state of load of the automobile.

In other words, it is desirable that the brake fluid pressure control starts at a brake fluid pressure which corresponds with a lower deceleration occuring in an unloaded automobile, and starts at a brake fluid pressure which corresponds with an increased deceleration occurring with a loaded automobile.

SUMMARY OF THE INVENTION

Accordingly, it is an object of this invention to provide a brake fluid-pressure control valve responsive to deceleration which overcomes the above described defects of the conventional brake fluid-pressure control valve.

Another object of this invention is to provide a brake fluid-pressure control valve responsive to deceleration in which the brake fluid pressure (at the time when the deceleration of the automobile has reached a predetermined valve is detected and the value of the deceleration of the automobile at which the control of the brake fluid pressure applied to the rear wheel cylinders starts), is substantially changed in accordance with the value of the detected brake fluid pressure.

A further object of this invention is to provide a brake fluid-pressure control valve responsive to deceleration by which an appropriate brake force can be imparted to the automobile both in the charge condition and in the no-loaded.

In accordance with an aspect of this invention, a brake-fluid pressure control valve responsive to deceleration includes a main body having a cylindrical bore; a first piston slidably fitted to the cylindrical bore; a second piston having a hollow, slidably fitted to the cylindrical bore; a first fluid pressure chamber formed between the first and second piston in the cylindrical bore; a second fluid pressure chamber formed at the opposite side of the first pistion to the first fluid pressure chamber in the cylindrical bore; a third fluid pressure chamber formed at the opposite side of the second piston to the first fluid pressure chamber in the cylindrical bore; a first passage through which the first and second fluid pressure chamber communicate with each other, a second passage through which the first and third fluid pressure chambers communicate with each other, the second passage including the hollow of the second piston; a first valve member for opening and closing the first passage; a second valve member responsive to deceleration, for open and closing the second passage, arranged in the hollow of the second pistion; a first spring extending between the first and second pistons, for urging the first piston from the side of the first fluid pressure chamber to the side of the second fluid pressure chamber and urging the second piston from the first fluid pressure chamber to the third fluid pressure chamber; and a second spring extending between main body and the first piston, for urging the first pistion from the side of the second fluid pressure chamber to the side of the first fluid pressure chamber, whereby the second passage is closed by the second valve member responsive to deceleration when the deceleration has reached a predetermined valve.

The foregoing and other objects, features, and advantages of the present invention will be more readily understood upon consideration of the following detailed description of the preferred embodiment of the invention, taken in conjunction with the accompanying drawings.

BRIEF DESCRIPTION OF THE DRAWINGS

FIG. 2 is an axial cross-sectional view of a brake fluid-pressure control valve responsive to deceleration according to another embodiment of this invention, showing it diagrammatically in relationship to other components of the brake system; and FIG. 3 is an end view of a control piston in the valve of FIG. 2.

DESCRIPTION OF THE PREFERRED EMBODIMENTS

Figure 1:
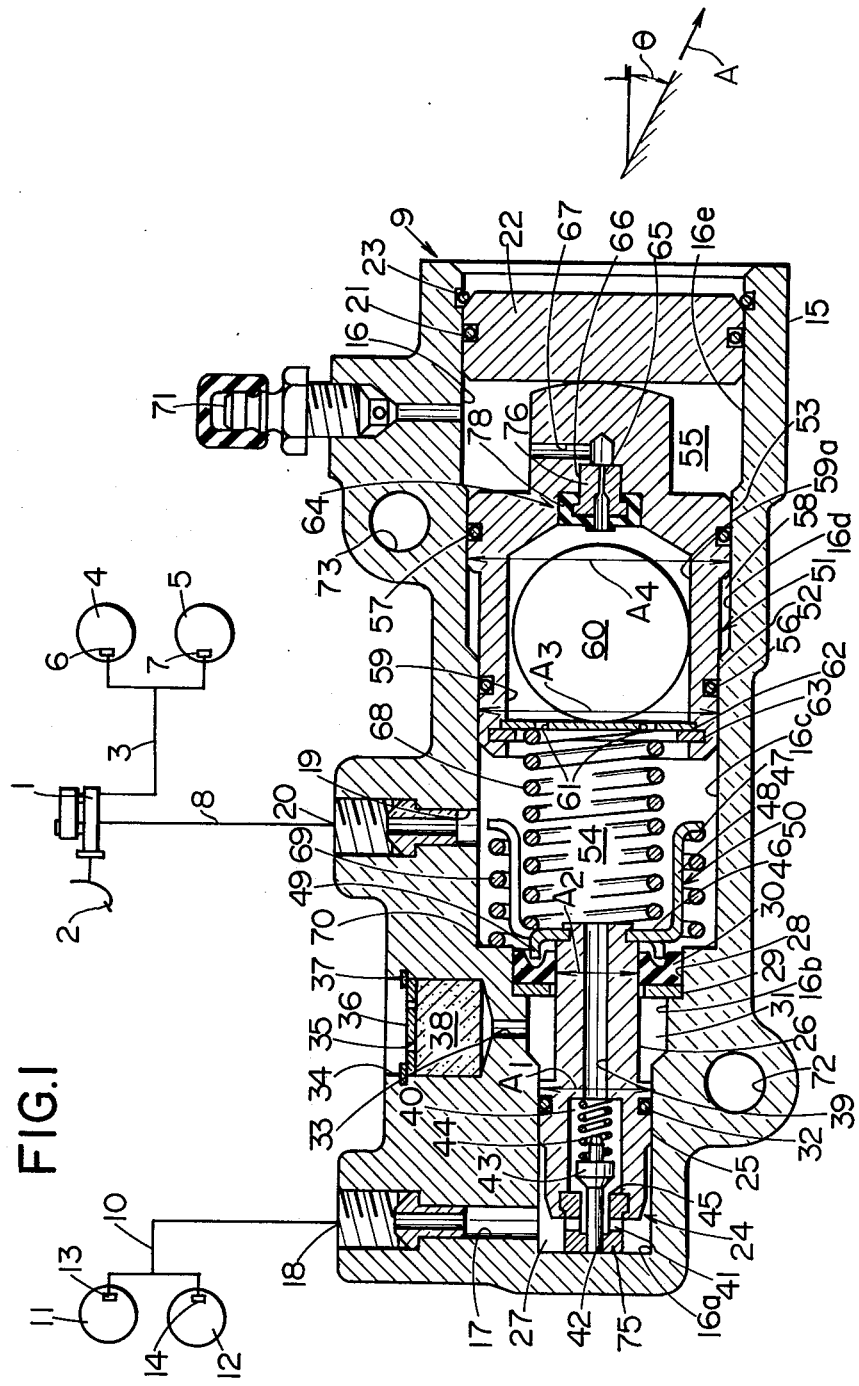
FIG. 1 is an axial cross-sectional view of a brake fluid-pressure control valve responsive to deceleration according to one embodiment of this invention, showing it diagrammatically in relationship to other components of the brake system.

Next, embodiments of this invention will be described with reference to the drawings.

FIG. 1 shows a brake fluid-pressure control valve responsive to deceleration according to one embodiment of this invention. A tandem master cylinder 1 (schematically shown in FIG. 1,) whose construction is well known, is driven with a brake pedal 2. The master cylinder 1 includes two fluid-pressure producing chambers independent of each other. One fluid-pressure producing chamber is connected through a conduit 3, to wheel cylinders 6 and 7 arranged in front wheels 4 and 5. The other fluid-pressure producing chamber is connected through a conduit 8 to a brake fluid pressure control valve 9 responsive to deceleration. The brake fluid-pressure control valve 9 is connected through a conduit 10 to wheel cylinders 13 and 14 arranged in rear wheels 11 and 12.

A stepped cylindrical bore 16 is made in a main body 15 of the brake fluid-pressure control valve 9, and it consists of bores 16a, 16b, 16c, 16d and 16e conjoined with each other. In FIG. 1, the stepped cylindrical bore 16 is closed at the left end of the main body 15, and it is open at the right end of the main body 15. The cylindrical bore 16a communicates with an outlet 18 connected to the conduit 10, through a path 17. The middle cylindrical bore 16c communicates with an inlet 20 connected to the conduit 8, through a path 19. The open end of the stepped cylindrical bore 16 is closed by a cover member 22 in which a seal ring 21 is fitted. The cover member 22 is fixed at the cylindrical bore 16e by a fastening ring 23, and it constitutes a right wall of the main body 15. A pressure-regulating piston 24 including a larger portion 25, (having larger diameter) and a smaller portion 26 (having smaller diameter) is arranged in the left hand of the stepped cylindrical hole 16. The larger portion 25 of the pressure-regulating piston 24 is slidably received by the cylindrical bore 16a. The cylindrical bore 16a is partitioned to form an outlet pressure chamber 27 by the left end of the pressure-regulating piston 24. The outlet pressure chamber 27 communicates with the outlet 18. An annular step 28 is formed between the cylindrical bores 16b and 16c. A backup ring 20 is received by the annular step 28. Further, a seal ring 30 is tightly fitted to the annular step 28 in contact with the backup ring 29. The backup ring 29 and the seal ring 30 have central openings, respectively. The smaller portion 26 of the pressure-regulating piston 24 is inserted through the central openings of the backup ring 29 and the seal ring 30, and it is liquid-tightly but slidably received by the central opening of the seal ring 30. An annular air chamber 31 is formed by the inner wall of the cylindrical bore 16b and the circumferential surface of the left hand of the smaller portion 26 of the pressure-regulating piston 24. A seal ring 32 is tightly fitted to an annular groove made in the circumferential surface of the larger portion 25 of the pressure-regulating piston 24. The air chamber 31 is liquid-tightly sealed by the seal rings 30 and 32.

A filter member 38 is inserted into a vertical hole 34 made in the main body 15, and it is covered by a pressing plate 36 having small openings 35. A fastening ring 37 is tightly fitted to the vertical hole 34 so as to fix the filter member 38. Thus, the air chamber 31 communicates via a path 33 and the filter member 38 with atmosphere. However, since the change of the air pressure in the air chamber 31 is smaller than the change of the brake fluid pressure in the fluid chambers formed at both sides of the pressure-regulating piston 24 during the movement of the pressure-regulating piston 24, it is not always necessary that the air chamber 31 communicates with atmosphere.

An axial path 39, a valve chamber 40 and radial bores 41 are made in the pressure-regulating piston 24. An ancillary piston member 75 is fixed to the top end of the pressure-regulating piston 24 as one body. The radial bores 41 are made in the ancillary piston member 75 of the pressure-regulating piston 24. The outlet pressure chamber 27 communicates via the axial path 39, valve chamber 40 and radial bores 41 with an inlet pressure chamber 54 which is formed at the right hand of the pressure-regulating piston 24.

A valve member 43 having a stud 42 is arranged in the valve chamber 40, and it is urged toward a valve seat 45 by a weakly prestressed valve spring 44 to contact the stud 42 with the bottom surface of the stepped cylindrical bore 16. The valve seat 45 is constituted by the inner edge of the ancillary piston member 75 of the pressure-regulating piston 24. As described hereinafter, when the pressure-regulating piston 24 is moved rightward, the valve member 43 contacts the valve seat 45 to intercept the fluid flow from the inlet pressure chamber 54 into the outlet pressure chamber 27, since the valve member 43 is urged leftward by the valve spring 44.

A cup-shaped spring receiver 50 is fixed to the right end of the pressure-regulating piston 24. It includes a flat bottom portion 46, a cylindrical portion 48, a flange portion 47 bent outwardly from the cylindrical portion 48, and a hook portion 49 bent leftward from the flat bottom portion 46. The hook portion 49 serves to prevent the seal ring 30 from falling out rightward by some reason or other.

A control piston 51 is arranged in the right hand of the stepped cylindrical bore 16. The control piston 51 includes a smaller portion 52 (having smaller diameter) and a larger portion 53 (having larger diameter). The smaller portion 52 is slidably fitted into the cylindrical bore 16c, while the larger portion 53 is slidably fitted into the cylindrical bore 16d. In the cylindrical bore 16c, the inlet pressure chamber 54 is formed by the left end of the smaller portion 52 and the right end of the pressure-regulating piston 24. In the cylindrical bores 16d and 16e, a control fluid-pressure chamber 55 is formed by the right end of the control piston 51 and the inner wall of the cover member 22. Further, an air chamber 58 is formed by the inner wall of the cylindrical bore 16d and the circumferential surface of the smaller portion 52 of the control piston 51. A seal ring 56 is fitted into an annular groove made in the circumferential surface of the smaller portion 52 of the control piston 51. Another seal ring 57 is fitted into an annular groove made in the larger portion 53 of the control piston 51. Thus, the air chamber 58 is fluid-tightly sealed. Although the air chamber 58 does not communicate with atmosphere in this embodiment, it may communicate with atmosphere in the same manner as the above-mentioned air chamber 32 which is formed by the circumferential surface of the smaller portion 26 of the pressure-regulating piston 24 and the inner wall of the cylindrical bore 16b.

A hollow 59 is formed in the control piston 51, open at the left end of the latter. A ball valve 60 as a valve responsive to deceleration is rollably put on a guide surface 59a of the hollow 59. The hollow 59 is covered by a ball valve support plate 62 having openings 61 which is fixed to the left end of the control piston 51 by a fastening ring 63. The ball valve 60 is prevented from falling out leftward by the ball valve support plate 62. A valve seat 64 is tightly fitted into an axial path 76 of the control piston 51. The valve seat 64 includes a seat-mounting member 66 which has a reducing bore 65, and a seat member 78 which has a central opening communicating with the reducing bore 65. The hollow 59 of the control piston 51 communicates via the central opening of the seat member 78, the reducing bore 65 and a radial path 67 with the control fluid-pressure chamber 55.

In the above described arrangement, when an automobile provided with the brake control valve according to this embodiment is braked at a predetermined deceleration, the ball valve 60 rolls rightward on the guide surface 59a of the hollow 59 to contact with the valve seat 64 for intercepting the fluid flow from the inlet pressure chamber 54 into the control chamber 55.

A first spring 68 extends between the flat bottom portion 46 of the spring receiver 50 and the ball valve support plate 62, and it is prestressed at a predetermined force, having a predetermined spring constant. Thus, the pressure-regulating piston 24 is urged leftward by the prestressed spring 68, while the control piston 51 is urged rightward by the prestressed spring 68.

A second spring 69 extends between a left annular step 70 of the cylindrical bore 16c and the flange portion 47 of the spring receiver 50. The second spring 69 is prestressed at a smaller predetermined force than the first spring 68, and it works to urge the pressure-regulating piston 24 in the direction opposite to the direction in which the pressure-regulating piston 24 is urged by the first spring 68, namely to weaken the urging force of the first spring 68.

An air discharge valve 71 is arranged above the control fluid-pressure chamber 55. It works to easily discharge air in the control chamber 55, while air is discharged from a brake system in the air discharge operation.

In FIG. 1, the right hand of the brake control valve 9 responsive to deceleration is in the front side of the automobile. In other words, the left hand of the brake control valve 9 is in the rear side of the automobile. The running direction of the automobile is shown by an arrow A in FIG. 1. The brake control valve 9 is so fixed to the chassis of the automobile through mounting holes 72 and 73 that it is inclined upwardly at an angle $\theta$ with respect to a horizontal line, namely the running direction A of the automobile. In FIG. 1, a line L represents a center line of the cylindrical bore 16 of the brake control valve 9. Accordingly, the guide surface 59a in the control piston 51 is included upwardly at the angle $\theta$ with respect to the horizontal line A. The angle $\theta$ is so set that, when the deceleration of the automobile reaches a predetermined value such as 0.3 g (g: acceleration of gravity), the ball valve 60 rolls rightward by its inertia to contact with the valve seat 64.

Next, operations of the above described brake fluid-pressure control valve 9 will be described.

When a driver actuates the brake pedal 2 to brake the automobile, brake fluid pressures are generated in the fluid pressure chambers of the tandem master cylinder 1. The brake fluid pressure from one fluid pressure chamber is applied through the conduit 3 to the wheel cylinders 6 and 7 of the front wheels 4 and 5 to brake the latter. At the same time, the brake fluid pressure from the other fluid pressure chamber is applied through the conduit 8, the inlet 20 of the brake fluid-pressure control valve 9 and the path 19 thereof to the inlet pressure chamber 54.

When the brake fluid pressure is so low that the pressure-regulating piston 24 urged leftward by the first spring 68 is located at the position shown in FIG. 1 the brake fluid pressure from the inlet pressure chamber 54 is transmitted through the axial path 39, valve chamber 40, gap between the valve member 43 and the valve seat 45, and radial bore 41 into the outlet pressure chamber 27. And from there, it is applied through the path 17, outlet 18 and conduit 10 into the wheel cylinders 13 and 14 of the rear wheels 11 and 12 to brake the latter.

On the other hand, the brake fluid pressure from the inlet pressure chamber 54 is transmitted through the openings 61 of the ball valve support plate 62 fixed to the left end of the control piston 51, hollow 59, reducing bore 65 and radial bore 67 into the control fluid-pressure chamber 55.

When the brake fluid pressure in the above described condition is represented by P, and areas of the smaller and larger portions 52 and 53 of the control piston 51 are represented by $A_3$ and $A_4$, respectively, the control piston 51 is urged leftward by a force of $(A_4-A_3)\cdot P$.

The brake fluid pressure rises with further strong actuation of the brake pedal 2. The increased brake fluid pressure is transmitted to the control chamber 55 from the inlet pressure chamber 54. The force of $(A_4-A_3)\cdot P$ which urges leftward the control piston 51, becomes larger than the initial prestressing force $F_{10}$ of the first spring 68 which is equal to the stressing force of the first spring 68 in the condition that the right end of the control piston 51 contacts with the cover member 22 as shown in FIG. 1. Accordingly, the control piston 51 starts to move leftward to compress the first spring 68. Thus, the stressing force of the first spring 68, namely the urging force applied to the spring receiver 50 becomes larger by the product of spring constant of the first spring 68 by movement length of the control piston 51 than the initial prestressing force $F_{10}$. The control piston 51 moves leftward, until the urging force of the first spring 68 becomes balanced with the force of $(A_4-A_3)\cdot P$.

Thus, while the control piston 51 is stopped at the position as shown in FIG. 1, the urging force of the first spring 68 is maintained at the initial prestressing force $F_{10}$. However, while the control piston 51 moves leftward with the increase of the brake fluid pressure in the condition that the inlet pressure chamber 54 communicates with the control fluid-pressure chamber 55, the urging force of the first spring 68 increases with the fluid pressure of $(A_4-A_3)\cdot P$ applied to the control piston 51.

When the predetermined deceleration is obtained for the automobile by the braking force applied to the front and rear wheels 4, 5, 11 and 12, the ball valve 60 rolls rightward on the guide surface 59a against the gravity due to the inclination θ by its inertia, to contact with the valve seat 64 so that the pressure fluid communication between the inlet pressure chamber 54 and the control fluid-pressure chamber 55 is interrupted.

After the interruption, the brake fluid is not supplied into the control fluid-pressure chamber 55 from the inlet pressure chamber 54. The pressure fluid is locked in the control fluid-pressure chamber 55. Regardless of the brake fluid pressure in the inlet pressure chamber 54, the control piston 51 is fixed at the position where it is stopped at the time when the pressure fluid communication between the inlet pressure chamber 54 and the control fluid-pressure chamber 55 is interrupted.

The urging force $F_1$ of the further compressed first spring 68 is equal to the fluid pressure applied to the control piston 51 at the time when the pressure fluid communication between the inlet pressure chamber 54 and the control fluid-pressure chamber 55 is interrupted. When such a brake pressure is represented by Pg, the urging force $F_1$ of the first spring 68 at the end of the compressing is expressed as follows:

$$F_1 = (A_4 - A_3)\cdot Pg \qquad (1)$$

Thus, the urging force $F_1$ is proportional to the brake fluid pressure at which the deceleration of the automobile reaches the predetermined valve (for example, 0.3 g).

The area difference $(A_4-A_3)$ between the larger and smaller portions 53 and 52 of the control piston 51 is so designed that the control piston 51 starts to be moved by such a brake fluid pressure as to be nearly equal to the brake fluid pressure at which the predetermined deceleration is obtained for the unloaded automobile. The highest deceleration is obtained at a constant fluid pressure, when the automobile is unloaded. In other words, when the automobile is unloaded, the ball valve 60 rolls to contact with the valve seat 64 for interrupting the pressure fluid communication between the inlet pressure chamber 54 and the control chamber 55 substantially at the same time when the control piston 51 starts to move leftward. When the automobile has some load, the brake fluid communication between the inlet pressure chamber 54 and the control fluid-pressure chamber 55 is interrupted by the ball valve 60 during the leftward movement of the control piston 51.

Next, there will be described the relative movement between the ball valve 60 and the valve seat 64 for interrupting the brake pressure fluid communication between the inlet pressure chamber 54 and the control fluid-pressure chamber 55, in relation to the increasing speed of the brake fluid pressure in the inlet pressure chamber 54.

When the brake pedal 2 is slowly driven, or in other words, when the increasing speed of the brake fluid pressure is low in the inlet pressure chamber 54, the brake fluid flows so slowly into the control chamber 55 from the inlet pressure chamber 54 through the reducing bore 65. Accordingly, the reducing bore 65 shows little resistance to the brake fluid flow. The brake fluid flows into the control chamber 55 almost without changing flow speed, namely without being subjected to reducing effect. Meantime, the control piston 51 starts to move leftward. The ball valve 60 remains located at the position shown in FIG. 1 by its gravity, until the deceleration of the automobile reaches the predetermined value. In other words, the ball valve 60 is separate from the valve seat 64. When the deceleration of the automobile reaches the predetermined value, the ball valve 60 rapidly comes to contact with the valve seat 64 to interrupt the brake pressure fluid communication between the inlet pressure chamber 54 and the control chamber 55. Because the control piston 51 moves leftward and the ball valve 60 rolls in opposite direction, namely rightward.

When the brake pedal is rapidly actuated, the brake fluid pressure increases rapidly in the inlet pressure chamber 54. The brake fluid flows rapidly toward the throttling or reducing bore 65. However, the flow of the brake fluid is suppressed by the throttling effect of the bore 65. Accordingly, the rising speed of the brake fluid pressure in the control chamber 55 is lower than that in the inlet pressure chamber 54. Further, the smaller portion 52 of the control piston 51 is exposed to the higher brake fluid pressure in the inlet pressure chamber 54. Accordingly, the control piston 51 does not move leftward, until the brake fluid pressure rises up sufficiently in the control chamber 55. Thus, the control piston 51 does not rapidly respond to the rapid rise-up of the brake fluid pressure of the inlet pressure chamber 54, but it responds to the brake fluid pressure of the inlet pressure chamber 54 in a lag time which is determined by the throttling effect of the reducing bore 65 and the rightward urging force applied to the control piston 51.

Generally, there exist a spring system and a damping system between wheels and chassis in the mechanics of an automobile. The damping system is normally represented as a dash pot in the schematic diagram of the mechanics. Accordingly, the deceleration of the automobile lags by some time behind the braking force applied to the wheels. For example, the lag time is about 0.2 seconds. When a brake pedal is rapidly actuated, a brake fluid pressure rises up excessively in the lag time. There is the fear that the brake fluid pressure at the time when the deceleration of the automobile has reached a predetermined valve is remarkably higher than the brake fluid pressure corresponding substantially to the predetermined value of the deceleration.

However, the control piston 51 responds to the brake fluid pressure applied from the master cylinder in the time lag, because of the throttling effect of the reducing bore 65 and the higher brake fluid pressure of the inlet pressure chamber 54, in the case that the brake pedal 2 is rapidly actuated. The other time lag in which the actual deceleration of the automobile responds to the brake fluid pressure applied from the master cylinder, is compensated by the time lag in which the control piston 51 responds to the fluid pressure. Thus, it can be avoided that an excessively high brake fluid pressure has an effect on the urging force of the first spring 68. When the deceleration of the automobile has reached the predetermined value, the ball valve 60 rapidly contacts with the valve seat 64 to interrupt the brake fluid communication between the inlet pressure chamber 54 and the control chamber 55.

When the brake pedal 2 is more rapidly actuated, the brake fluid flows so rapidly into the control chamber 55 through the throttling bore 65 from the inlet pressure chamber 54 as to move the control piston 51 leftward, although the throttling bore 65 shows the high resistance to the brake fluid flow and the higher brake pressure is applied from the inlet pressure chamber 54. At that time, the control piston 51 moves leftward with some acceleration. Accordingly, even when the deceleration of the automobile is not so high as to roll the ball valve 60 by its inertia, the ball valve 60 comes to contact with the valve seat 64 by the leftward acceleration of the control piston 51. The brake fluid in the control chamber 55 is sealed by the contact of the ball valve 60 and valve seat 64. Accordingly, the leftward movement of the control piston 51 stops temporarily. However, since the deceleration of the automobile does not yet reach the predetermined value, the ball valve 60 moves leftward to the original position. The brake fluid flows again into the control chamber 55 from the inlet pressure chamber 54 to move the control piston 51 leftward. After such operation or after repetition of such operation, the deceleration of the automobile reaches the predetermined value, and the ball valve 60 comes to contact with the valve seat 64 to interrupt the brake fluid communication between the inlet pressure chamber 54 and the control chamber 55.

As above described, when the brake pedal 2 is more rapidly actuated, the ball valve 50 comes to contact with the valve seat 64 with the accelerated leftward movement of the control piston, before the deceleration of the automobile reaches the predetermined value. Accordingly, the flowing speed of the brake fluid into the control chamber 55 is, in the general, lowered to avoid the influence of the excessive rising speed of the brake fluid of the inlet pressure chamber 54. Thus, the urging force of the first spring 68 is set to a suitable value.

Next, there will be described the relationship between the urging force of the first spring 68 and the movement of the pressure-regulating piston 24.

When the prestressing force of the second spring 69 is represented by $F_2$, the area of the smaller portion 26 of the pressure-regulating piston 24 facing to the inlet pressure chamber 54 is represented by $A_2$, and the area of the larger portion 25 of the pressure-regulating piston 24 facing to the outlet pressure chamber 27 is represented by $A_1$, a force $F_L$ urging the pressure-regulating piston 24 leftward, and anther force $F_R$ urging the pressure-regulating piston 24 rightward are expressed by the following equations:

$$F_L = (F_1 - F_2) + A_2 \cdot P \quad \text{and}$$

$$F_R = A_1 \cdot P$$

, where $F_1$ represents the prestressing force of the first spring 68, and P represents the fluid pressure of the inlet pressure chamber 54 and outlet pressure chamber 27 which communicate with each other.

The brake fluid pressure of the outlet pressure chamber 27 increases with that of the inlet pressure chamber 54. When the force $F_R$ urging the pressure-regulating piston 24 rightward becomes larger than the opposite force $F_L$ urging the pressure-regulating piston 24 leftward, the pressure-regulating piston 24 starts to move rightward. Since the stud 42 of the valve member 43 is maintained in contact with the left close end of the cylindrical bore 16a by the valve spring 44, the valve member 43 contacts with the valve seat 45 to interrupt the brake fluid communication between the inlet pressure chamber 54 and the outlet pressure chamber 27. Thus, the control of the brake fluid pressure is started for the outlet pressure chamber 27. The control start fluid pressure Pc at which complete valve closure or valve opening occurs, is the fluid pressure at which the force urging the pressure-regulating piston 24 rightward becomes substantially equal to the opposite force urging the pressure-regulating piston 24 leftward. Accordingly, the following equation is obtained:

$$A_1 P_c = (F_1 - F_2) + A_2 \cdot P_c,$$

therefore, $$P_c = \frac{F_1 - F_2}{A_1 - A_2} \tag{2}$$

Thus, the control start fluid pressure $P_c$ is proportional to the difference between the urging force $F_1$ of the first spring 68 and the prestressing force $F_2$ of the second spring 69. The urging force $F_1$ of the first spring 68 is determined by the brake fluid pressure $P_g$ at which the deceleration of the automobile reaches the predetermined value, as shown by the equation (1). Accordingly, the relationship between the control start fluid pressure $P_c$ and the brake fluid pressure $P_g$ is represented by the following equation:

$$P_c = \frac{A_4 - A_3}{A_1 - A_2} \cdot P_g - \frac{F_2}{A_1 - A_2} \quad (3).$$

The control start fluid pressure $P_c$ is so designed as to be higher than the brake fluid pressure $P_g$ at which the ball valve 60 contacts with the valve seat 64 in such a manner that the areas $A_1$ and $A_2$ of the larger and smaller portions 25 and 26 of the pressure-regulating piston 24, and the prestressing force $F_2$ of the second spring 69 are set to suitable values. In other words, the pressure-regulating piston 24 is so designed as to start to move rightward at the brake fluid pressure which is higher than the brake fluid pressure $P_g$.

Next, from the equation (3), there will be calculated a deceleration $\alpha_c$ of the automobile at the time when the brake fluid pressure P reaches the control start fluid pressure $P_c$.

Generally, a deceleration $\alpha$ of the automobile is represented by the following equation:

$$\alpha = (g/W) \cdot B$$

, where g represents acceleration of gravity, W weight of the automobile, and B a braking force generated in the wheels. Since the braking force B is proportional to a brake fluid pressure P, the following relationship is obtained:

$$\alpha = K \cdot (P/W) \quad (4)$$

, where K is constant.

From the equations (3) and (4), the deceleration $\alpha$ of the automobile at the control start fluid pressure $P_c$ is expressed by the following equation:

$$\alpha_c = \frac{A_4 - A_3}{A_1 - A_2} \cdot \alpha_g - \frac{F_2}{A_1 - A_2} \cdot \frac{K}{W} \quad (5)$$

, where $\alpha$ g represents the predetermined deceleration of the automobile. The first term $$(\frac{A_4 - A_3}{A_1 - A_2} \cdot \alpha_g)$$

is constant, since $\alpha_g$ is constant. However, the second term $$(\frac{F_2}{A_1 - A_2} \cdot \frac{K}{W})$$

decreases with the increase of the weight of the automobile.

Since $$\frac{F_2}{A_1 - A_2} \cdot K > 0,$$

the deceleration $\alpha_c$ of the automobile is smaller, when the weight of the automobile is small, namely when the automobile is unloaded. It increases with the increasing load of the automobile.

With further actuation of the brake pedal 2, the brake fluid pressure in the inlet pressure chamber 54 becomes higher than the control start fluid pressure $P_c$. The area $A_2$ of the smaller portion 26 of the pressure-regulating piston 24 is subjected to the increased fluid pressure in the inlet pressure chamber 54. Accordingly, the pressure-regulating piston 24 moves leftward to separate the valve member 43 from the valve seat 45, and thereby to flow the brake fluid from the inlet pressure chamber 54 into the outlet pressure chamber 27. However, the pressure-regulating piston 24 again starts to move rightward, before the brake fluid pressure in the outlet pressure chamber 27 reaches the increased brake fluid pressure in the inlet pressure chamber 54. Because the area $A_1$ of the larger portion 25 facing to the outlet pressure chamber 27 is larger the area $A_2$ of the smaller portion 26 facing to the inlet pressure chamber 54. The valve member 45 again contacts with the valve seat 45. Hereafter, the separation and contact of the valve member 43 are repeated at brake fluid pressures beyond the control start fluid pressure $P_c$. Thus, the brake fluid pressure is controlled in the outlet pressure chamber 27 communicating with the rear brake wheel cylinders 13 and 14.

When the fluid pressures in the inlet pressure chamber 54 and outlet pressure chamber 27 are represented by $P_i$ and $P_o$, respectively, the relationship between $P_i$ and $P_o$ are expressed by the following equation:

$$A_1 \cdot P_o = A_2 \cdot P_i + (F_1 - F_2),$$

therefore, $$P_o = \frac{A_2}{A_1} \cdot P_i + \frac{(F_1 - F_2)}{A_1}.$$

Accordingly, the rising rate of the fluid pressure $P_o$ in the outlet pressure chamber 27 is lower by factor of $A_2/A_1(<1)$ than that of the fluid pressure $P_i$ in the inlet pressure chamber 54. Such brake fluid pressure is transmitted to the rear wheel brake cylinders 13 and 14.

The above-described embodiment has the following advantages.

(1) The second spring 69 is so arranged as to oppose to the urging force of the first spring 68 for urging the pressure-regulating piston 24 in the direction to open the valve member 43. The deceleration of the automobile at the fluid pressure control start (so-called "switch-over point or knee point") can increase, accordingly as the brake fluid pressure at the time when the deceleration of the automobile reaches the predetermined value increases, namely accordingly as the load of the automobile increases.

(2) The control piston 51 is slidably arranged in the stepped cylindrical bore 16. The ball valve responsive to the predetermined deceleration is arranged in the hollow of the control piston 51. The smaller portion of the control piston 51 is subjected to the brake fluid pressure in the inlet pressure chamber 54, and the larger portion of the control piston 51 is subjected to the brake fluid pressure in the control chamber 55. Accordingly, when the predetermined deceleration is detected, the ball valve 60 and the valve seat fixed to the control piston 51 are moved to each other, and so the brake control valve of this embodiment is highly responsive. The time for the valve closure is shortened.

(3) The throttling bore 65 is made in the control piston 51. Accordingly, when the brake pedal 2 is rapidly actuated, the flow speed of the brake fluid from the inlet pressure chamber 54 into the control chamber 55 is reduced. The lag of the deceleration of the automobile behind the braking force applied to the wheel cylinders is compensated by the reducing effect. The occurrence of the excessively high brake fluid pressure can be avoided thereby.

(4) When the brake pedal 2 is more rapidly actuated, the brake fluid flows into the control chamber 55 at a high speed. Although the deceleration of the automobile is lower than the predetermined value, the valve seat 64 of the control piston 51 is moved with acceleration to contact with the ball valve 60. It can be avoided thereby that the brake fluid pressure in the control chamber 55 become excessively high. In other words, the ball valve 60 functions as a throttling valve, until the automobile obtains the predetermined deceleration to roll the ball valve 60 to the valve seat 64 by its inertia.

(5) The ball valve 60 responsive to the deceleration is arranged in the hollow of the control piston 51. A special chamber for receiving the ball valve 60 is not provided in the brake fluid-pressure control control valve of this embodiment. Thus, it is compact in construction.

(6) The cup-shaped spring receiver 50 is fixed to the top end of the pressure-regulating piston 24. One end of the first spring 68 is received by the bottom flat portion of the spring receiver 50, and one end of the second spring 69 is received by the flange portion 47 of the spring receiver 50. Accordingly, the first and second springs 68 and 69 can be held in very simple construction. Moreover, it can be securely held in the brake fluid-pressure control valve of this embodiment.

Figures 2, 3:
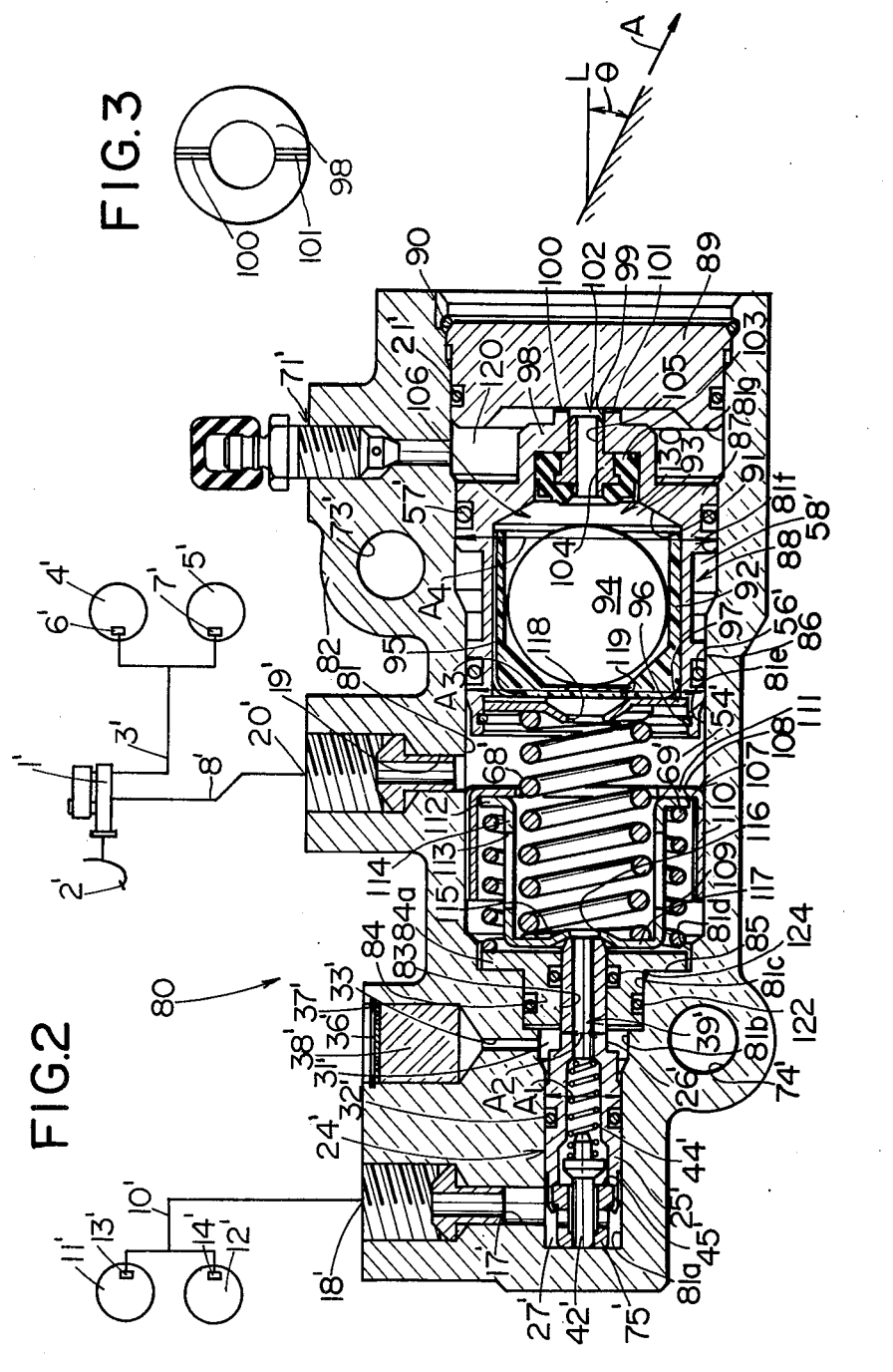

Next, another embodiment of this invention will be described with reference to FIG. 2 and FIG. 3. In FIG. 2, the parts which correspond to similar parts in FIG. 1 are denoted by the same reference numerals, with a prime affixed.

A fluid pressure control valve responsive to deceleration according to this embodiment is denoted generally by a reference numeral 80. A stepped cylindrical bore 81 consisting of cylindrical bores 81a to 81g is made in a main body 82 of the control valve 80. The diameters of the cylindrical bores 81a to 81g are enlarged in order. The stepped cylindrical bore 81 is open at its one end.

The larger portion 25' of the pressure-regulating piston 24' is slidably fitted to the cylindrical bore 81a to form the outlet pressure chamber 27'. An annular member 84 is tightly fitted to the cylindrical bore 81c. The smaller portion 26' of the pressure-regulating piston 24' is slidably fitted to a central opening 83 of the annular member 84 which is sealed by seal rings 122 and 124. The air chamber 31' is formed by the smaller portion 26' of the pressure-regulating piston 24' in the cylindrical bore 81b, and it communicates through the path 33' and the filter member 38' with the exterior of the main body 82, in the same manner as in the embodiment of FIG. 1.

The annular member 84 has a flange portion 84a which is positioned at the cylindrical bore 81d. The flange portion 84a serves as a spring receiver as described hereinafter, and is pressed to a step surface 85 between the cylindrical bores 81c and 81d.

A control piston 88 including a smaller portion 86 and a larger portion 87 is slidably arranged in the cylindrical bores 81e and 81f. The smaller portion 86 of the control piston 88 is slidably fitted to the cylindrical bore 81e, and the larger portion 87 of the control piston 88 is slidably fitted to the cylindrical bore 81f. The inlet pressure chamber 54' is formed between the annular member 84 fitted to the pressure-regulating piston 24' and the control piston 88. A control fluid-pressure chamber 120 is formed between the control piston 88 and a cover member 89 which covers the open end of the stepped cylindrical bore 81. In the same manner as in the embodiment of FIG. 1, the air chamber 58' is formed by the circumferential surface of the smaller portion 86 of the control piston 88 and the inner wall of the cylindrical bore 81e. The cover member 89 is fixed to the open end of the stepped cylindrical bore 81 by a fastening ring 90.

A hollow 91 is made in the control piston 88, opening at its left end. A substantially cup-shaped ball guide 92 made of synthetic resin is received by the hollow 91, opening to its right end. A ball valve 94 is rotatably received by a valve chamber 93 which is formed by the hollow 91 and the ball guide 92. Axial grooves 95 are formed in the outer surface of the ball guide 92 at suitable intervals. A spring receiving member 97 serving as a support for the ball guide 92 is fixed to the open end of the hollow 91 by a fastening ring 96 to cover the hollow 91.

A projection 98 is formed on the center of the right end of the control piston 88, and it is contactable with the inner wall of the cover member 89. A central bore 99 is made in the projection 98, through which the inlet pressure chamber 54' communicates with the control fluid-pressure chamber 120. Throttling grooves 100 and 101 are formed in the right end surface of the projection 98, as clearly shown in FIG. 3, and they extend in the radial direction. When the projection 98 contacts with the inner wall of the cover member 89, the central opening 99 of the control piston 88 communicates only through the radial grooves 100 and 101 with the control fluid-pressure chamber 120. Thus, a variable throttling apparatus 102 is constituted by the projection 98, the inner wall of the cover member 89 and the radial grooves 100 and 101.

A valve seat 103 for the ball valve 94 is fitted to the central opening 99 through a seat mount 104. When the automobile has obtained the predetermined deceleration, the ball valve 94 rolls on the ball guide 92 to contact with the valve seat 103. Thus, a deceleration-responsive valve 130 is constituted by the ball valve 94 and the valve seat 103, and it functions to open and close a passage 106 constituted by the grooves 95 of the ball guide 92, the valve chamber 93, a central opening 105 of the seat mount 104 and the central opening 99. The inlet pressure chamber 54' communicates through the passage 106 with the control fluid-pressure chamber 90.

A substantially cup-shaped spring receiver 107 is slidably received by the cylindrical bore 81e in the inlet pressure chamber 54' between the pressure-regulating chamber 24' and the control piston 88. The spring receiver 107 consists of substantially cylindrical receiver members 108 and 109 fixed to each other. The one receiver member 108 slidable on the inner wall of the cylindrical bore 81e has a cylindrical portion 110 and a flange portion 111 bent inwardly from the right end of the cylindrical portion 110. Axial grooves are made at suitable intervals in the inner and outer circumferential surfaces of the cylindrical portion 110. The other receiver member 109 has a bottom portion 117, a cylindrical portion 114 and a flange portion 112 bent outwardly from the right end of the cylindrical portion 114. The diameter of the cylindrical portion 114 of the other receiver member 109 is smaller than the diameter of the cylindrical portion 110 of the one receiver member 108. The flange portion 112 of the other receiver member 109 is fixed to the flange portion 111 of the one receiver member 108, for example, by welding. Openings 113 are made in the cylindrical portion 114 of the other cup-shaped receiver member 109. The bottom portion 117 of the other receiver member 109 has a cone-truncated projection 115 at its center. A central opening 116 is made in the projection 115. The projection 115 contacts with the top end of the pressure-regulating piston 24'.

The prestressed first spring 68' is arranged between the bottom portion 117 of the spring receiver 108 and the other spring receiver 97 fixed to the control piston 88. The pressure-regulating piston 24' and the control piston 88 are urged in the opposite directions by the prestressed first spring 68'. Thus, the left end of the pressure-regulating piston 24' is pressed to the bottom surface of the stepped cylindrical bore 81, and the projection 98 of the control piston 88 is pressed to the inner wall of the cover member 89. The prestressed second spring 69' is arranged between the flange portion 112 of the spring receiver 108 and the flange portion 84a of the annular member 84. The prestressing force of the second spring 69' is lower than that of the first spring 68'. The flange portion of the annular member 84a of the annular member 84 is pressed to the step surface 85. The second spring 69' urges the pressure-regulating spring 24' in the direction to oppose to the urging force of the first prestressed spring 68'. The inlet pressure chamber 54' communicates through the path 19' and the inlet 20' with the conduit 8' connected to the master cylinder 1'. And the inlet pressure chamber 54' communicates through the central opening 118 of the spring receiver 97 and an opening 119 made in the ball guide 92 with the valve chamber 93.

Operations of the above described brake fluid-pressure control valve 80 are substantially the same as those of the brake fluid-pressure control valve 9 of FIG. 1 except the difference between the operations of the reducing bore 65 of FIG. 1 and the throttling apparatus 102.

The throttling effect of the reducing bore 65 of FIG. 1 is constant regardless of the movement of the control piston 51. However, the throttling effect of the throttling apparatus 102 of FIG. 2 varies with the movement of the control piston 88. Thus, the throttling apparatus 102 of the second embodiment has some throttling effect, unless the projection 98 of the control piston 88 is separated from the inner wall of the cover member 89. Because reducing bores are formed by the grooves 100 and 101 of the projection 98 and the inner wall of the cover member 89 contacting with the preojection 98.

According to the embodiment of FIG. 1, there is, in some cases, the fear that a required brake fluid pressure at the control start (knee point) cannot be obtained for a fully loaded automobile when it is rapidly braked, because the reducing bore 65 shows much throttling effect even after the start of the movement of the control piston 51. According to the embodiment of FIG. 2, such fear can be removed by the variable throttling apparatus 102.

Although the embodiment of FIG. 2 has substantially the same advantages as that of FIG. 1, it has further the following advantage;

The first and second springs 68' and 69' are received by the cup-shaped spring receiver 107 slidably fitted to the cylindrical bore 81e. Accordingly, there is little possibility that the springs 68' and 69' are deviated from the center axis of the cylindrical bore 81. Thus, they can be more stably held in the cylindrical bore 81.

While the preferred embodiments have been described, variations thereto will occur to those skilled in the art within the scope of the present inventive concepts which are delineated by the following claims.

For example, in the embodiment of FIG. 1, the first and second springs 68 and 69 are received by the cup-shaped spring receiver 50. However, it may be omitted. In that case, the pressure-regulating piston 24 is elongated rightward with respect to FIG. 1, and a flange portion is formed on the right end of the pressure-regulating piston 24. The first and second springs 68 and 69 are received by the right and left surfaces of the flange portion.

Further, in the embodiment of FIG. 1, the second spring 69 extends between the step 70 of the cylindrical bore 16 and the flange portion 47 of the spring receiver 50. However, the second spring 69 may extends in the outlet pressure chamber 27. In that case, its one end is received by the bottom 27 of the cylindrical bore 16, while its another end is received by one end of the pressure-regulating piston 24.

Further, in the embodiment of FIG. 1, the pressure-regulating piston 24 and the control piston 51 are separated from each other. However, the pressure-regulating piston 24 is so elongated that its right end is slidably supprted by the control piston 51. In that case, construction of the control piston 51 at the inlet pressure chamber should be varied, and a radial bore to communicate with the inlet pressure chamber 54 should be made in the pressure-regulating piston 24.

Further in the embodiment of FIG. 2, the grooves 100 and 101 are made in the projection 98 of the control piston 88. However, they may be made in the inner wall of the cover member 89 instead of the projection 98 of the control piston 88. In that case, the same effect as in the apparatus 102 can be obtained.

What is claimed is:

1. A brake fluid pressure control valve responsive to deceleration comprising:

(A) a main body having a cylindrical bore;
(B) a first piston slidably fitted to said cylindrical bore;
(C) a second piston having a hollow, slidably fitted to said cylindrical bore;
(D) a first fluid pressure chamber formed between said first and second pistons in said cylindrical bore;
(E) a second fluid pressure chamber formed at the opposite side of said first piston to said first fluid pressure chamber in said cylindrical bore;
(F) a third fluid pressure chamber formed at the opposite side of said second piston to said first fluid pressure chamber in said cylindrical bore;
(G) a first passage through which said first and second fluid pressure chamber communicate with each other;
(H) a second passage through which said first and third fluid pressure chambers communicate with each other, said second passage including said hollow of the second piston;
(I) a first valve member for opening and closing said first passage;
(J) a second valve member responsive to deceleration, for opening and closing said second passage, arranged in said hollow of the second piston;
(K) a first spring extending between said first and second pistons, for urging said first piston from the side of said first fluid pressure chamber to the side of said second fluid pressure chamber and urging said second piston from the side of said first fluid pressure chamber to the side of said third fluid pressure chamber; and (L) a second spring extending between said main body and said first piston, for urging said first piston from the side of said second fluid pressure chamber to the side of said first fluid pressure chamber, whereby said second passage is closed by said second valve member responsive to deceleration when said deceleration has reached a predetermined valve.

2. A brake fluid pressure control valve responsive to deceleration according to claim 1, in which said first and second springs are received by a common spring receiver.

3. A brake fluid pressure control valve responsive to deceleration according to claim 2, in which said common spring receiver is substantially cup-shaped, and includes a flange portion and a bottom portion, said first spring being received by said bottom portion, and said second spring being received by said flange portion.

4. A brake fluid pressure control valve responsive to deceleration according to claim 2, in which said common spring receiver is substantially cup-shaped, comprising a first and second cylindrical members arranged concentrically with each other and fixed to each other, said first cylindrical member includes a cylindrical portion slidably fitted to said cylindrical bore, and said second cylindrical member includes another cylindrical portion, a flange portion and a bottom portion, said first spring being received by said bottom portion of the second cylindrical member, and said second spring being received by said flange portion of the second cylindrical member so as to extend between the cylindrical portions of said first and second cylindrical members.

5. A brake fluid pressure control valve responsive to deceleration according to claim 4, in which axial grooves are made in the inner and outer surfaces of said cylindrical portion of the first cylindrical member.

6. A brake fluid pressure control valve responsive to deceleration according to claim 1, in which throttling means is arranged in said second passage, and said hollow communicates through said throttling means with said third fluid pressure chamber.

7. A brake fluid pressure control valve responsive to deceleration according to claim 6, in which said throttling means is a reducing bore made in one end portion of said second piston.

8. A brake fluid pressure control valve responsive to deceleration according to claim 6, in which said throttling means is a variable throttling apparatus whose throttling effect varies with the movement of said second piston.

9. A brake fluid pressure control valve responsive to deceleration according to claim 8, in which said variable throttling apparatus is formed between one end of said second piston and the inner wall of the closed one end of said cylindrical bore.

10. A brake fluid pressure control valve responsive to deceleration according to claim 9, in which said variable throttling apparatus is formed by at least one groove made in the one end of said second piston and the inner wall of the closed one end of said cylindrical bore.

11. A brake fluid pressure control valve responsive to deceleration according to claim 9, in which said variable throttling apparatus is formed by the one end of said second piston and at least one groove made in the inner wall of the closed one end of said cylindrical bore.

12. A brake fluid pressure control valve responsive to deceleration according to claim 1, in which said first piston has a smaller area subjected to the fluid pressure of said first fluid pressure chamber and a larger area subjected to the fluid pressure of said second fluid pressure chamber.

13. A brake fluid pressure control valve responsive to deceleration according to claim 12, in which said second piston has a smaller area subjected to the fluid pressure of said first fluid pressure chamber and a larger area subjected to the fluid pressure of said third fluid pressure.

14. A brake fluid pressure control valve responsive to deceleration according to claim 13, in which the difference between the smaller and larger areas of said first piston is smaller than that between the smaller and larger areas of said second piston.

15. A brake fluid pressure control valve responsive to deceleration according to claim 12, in which said first piston is a stepped piston.

16. A brake fluid pressure control valve responsive to deceleration according to claim 13, in which said second piston is a stepped piston.

17. A brake fluid pressure control valve responsive to deceleration according to claim 1, in which said second valve member responsive to deceleration is a ball rollable on the wall of said hollow.

18. A brake fluid pressure control valve responsive to deceleration according to claim 1, in which said second valve member responsive to deceleration is rollably received by a substantially cup-shaped guide means arranged in said hollow.

19. A brake fluid pressure control valve responsive to deceleration according to claim 18, in which said guide means includes a circumferential wall and a bottom wall, grooves are formed in said circumferential wall, and an opening is made in said bottom wall, said grooves and opening being included in said second passage.

20. A brake fluid pressure control valve responsive to deceleration according to claim 19, in which said second valve means is a ball.

* * * * *